(12) United States Patent
Reeves et al.

(10) Patent No.: US 9,338,616 B1
(45) Date of Patent: May 10, 2016

(54) MESSAGE ROUTING USING A MULTI-ENTITY DESTINATION IDENTIFIER

(71) Applicant: Sprint Communications Company L.P., Overland Park, KS (US)

(72) Inventors: Raymond Emilio Reeves, Oviedo, FL (US); Gregory Anderson Drews, Los Angeles, CA (US); Brian D. Farst, Hollywood, CA (US); Young Suk Lee, Philadelphia, PA (US)

(73) Assignee: Sprint Communications Company L.P., Overland Park, KS (US)

( * ) Notice: Subject to any disclaimer, the term of this patent is extended or adjusted under 35 U.S.C. 154(b) by 146 days.

(21) Appl. No.: 14/160,648

(22) Filed: Jan. 22, 2014

(51) Int. Cl.
*H04W 4/14* (2009.01)
*H04M 1/725* (2006.01)
*H04W 88/18* (2009.01)

(52) U.S. Cl.
CPC ............ *H04W 4/14* (2013.01); *H04M 1/72547* (2013.01); *H04M 1/72552* (2013.01); *H04M 2215/2073* (2013.01); *H04W 88/184* (2013.01)

(58) Field of Classification Search
CPC .. H04W 88/184; H04W 4/14; H04M 1/72552
USPC .................... 455/412.1, 412.2, 466
See application file for complete search history.

(56) References Cited

U.S. PATENT DOCUMENTS

| 2005/0009541 | A1* | 1/2005 | Ye ..................... G06Q 10/107 455/466 |
| 2011/0143784 | A1* | 6/2011 | Ahluwalia ............... 455/466 |
| 2011/0268022 | A1* | 11/2011 | Xu ............................ 455/466 |
| 2012/0302268 | A1* | 11/2012 | Casto et al. ............... 455/466 |

FOREIGN PATENT DOCUMENTS

WO 2012017245 2/2012

* cited by examiner

*Primary Examiner* — Mazda Sabouri
*Assistant Examiner* — Jaime Holliday

(57) ABSTRACT

Embodiments disclosed herein provide systems and methods for routing messages having destination identifiers associated with multiple entities. In a particular embodiment, a method provides receiving a message from a communication device directed to the message routing system, wherein a destination identifier associated with a plurality of entities indicates the message routing system. The method further provides identifying an entity of the plurality of entities associated with a key indicator within content of the message and routing the message based on the entity.

16 Claims, 9 Drawing Sheets

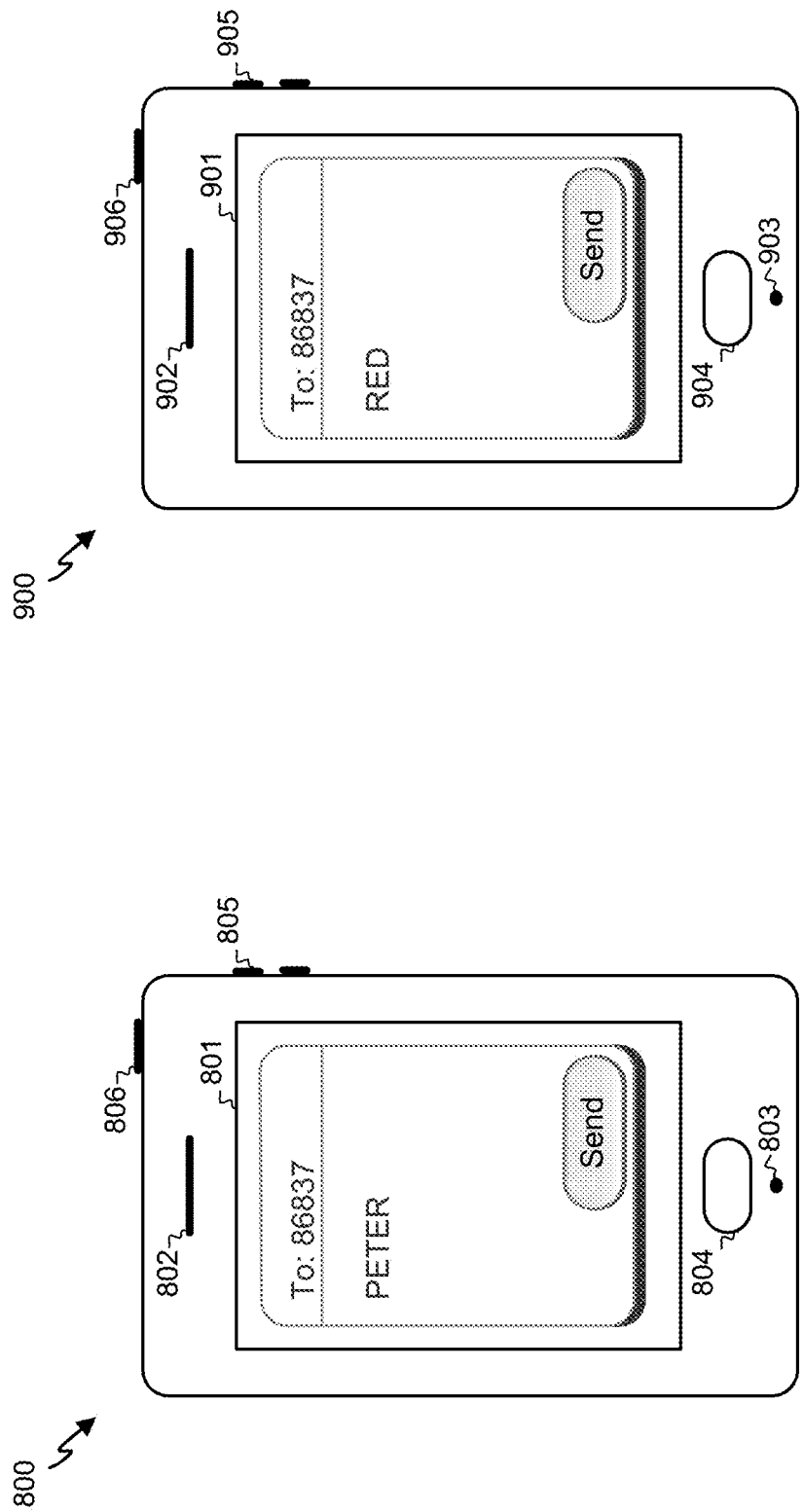

MESSAGE ROUTING USING A MULTI-ENTITY DESTINATION IDENTIFIER

TECHNICAL BACKGROUND

Premium messaging services allow entities, such as corporations, to receive messages using specialized destination identifiers. For example, premium Short Messaging Service (SMS) systems allow abbreviated dialing codes, known as short codes, to be used when transferring an SMS message. Instead of using a full 7 or 10 digit telephone number to direct a text message, a user is able to direct a message to a number with fewer digits (e.g. 5 digits). Fewer digits may be easier to remember and easier to enter than full length telephone numbers. Therefore, short codes are desirable for entities requesting information in messages from users (e.g. when requesting user votes via SMS).

Unfortunately, there are a limited number of possible short codes and even fewer more desirable short codes, such as short codes with easy number combinations (e.g. 12345) or short codes that correspond to words spelled out on the dial pad. A premium SMS system is only able to allow a single entity to use a given short code at a given time. Therefore, other entities wanting to use a particular short code must consider other short code options.

OVERVIEW

Embodiments disclosed herein provide systems and methods for routing messages having destination identifiers associated with multiple entities. In a particular embodiment, a method provides receiving a message from a communication device directed to the message routing system, wherein a destination identifier associated with a plurality of entities indicates the message routing system. The method further provides identifying an entity of the plurality of entities associated with a key indicator within content of the message and routing the message based on the entity.

BRIEF DESCRIPTION OF THE DRAWINGS

FIG. 8 illustrates a wireless communication device for routing messages having destination identifiers associated with multiple entities.

FIG. 9 illustrates a wireless communication device for routing messages having destination identifiers associated with multiple entities.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
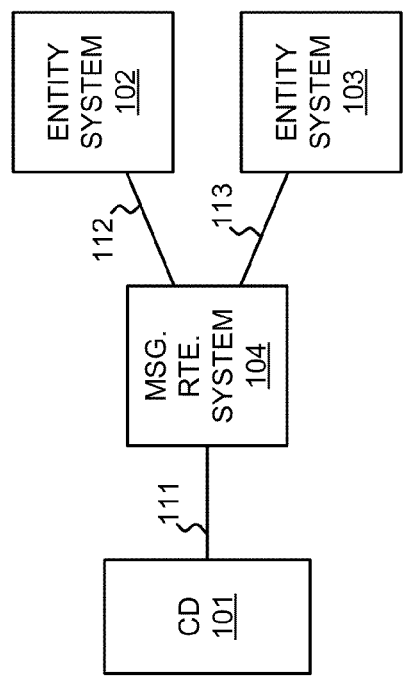
FIG. 1 illustrates a communication system for routing messages having destination identifiers associated with multiple entities.

FIG. 1 illustrates communication system 100. Communication system 100 includes communication device 101, entity system 102, entity system 103, and message routing system 104. Communication device 101 and message routing system 104 communicate over communication link 111. Message routing system 104 and entity system 102 communicate over communication link 112. Message routing system 104 and entity system 103 communicate over communication link 113.

In operation, message routing system 104 receives messages directed to one or more destination identifiers. Typically, a destination identifier is associated with a single entity, such as an individual, business, customer, advertiser, or otherwise. Accordingly, in those situations, message routing system 104 would not need to distinguish between multiple entities being associated with the same identifier. However, message routing system 104 is capable of handling messages directed to destination identifiers that are associated with multiple entities. Messages intended for one entity of the multiple entities may need to be handled differently (e.g. directed to different locations or processed differently). Therefore, message routing system 104 determines which entity of the multiple entities associated with a particular destination identifier is the intended recipient of the message.

Figure 2:
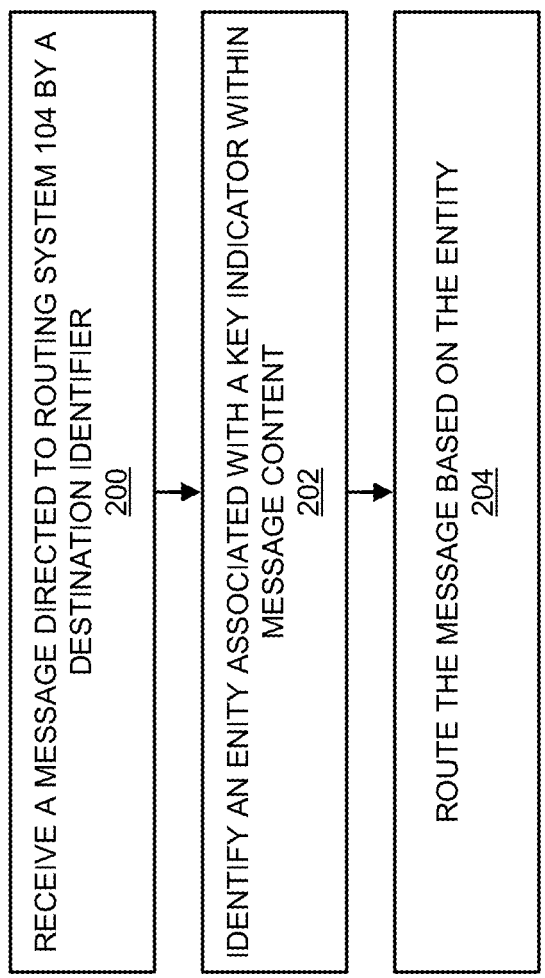
FIG. 2 illustrates an operation of the communication system to route messages having destination identifiers associated with multiple entities.

FIG. 2 illustrates an operation of communication system 100 to route messages having destination identifiers associated with multiple entities. Message routing system 104 receives a message directed to message routing system 104 from communication device 101 (step 200). A destination identifier associated with a plurality of entities indicates the message routing system. The destination identifier is associated with multiple entities. The destination identifier may be associated with each of the multiple entities based on each entity paying a fee or otherwise subscribing for the use of the destination identifier or by other means. The destination identifier may be a telephone number, a short code, network address, email address, or any other means of identifying a destination on a computer or communication system. Any communication systems and networks that exist on communication link 111 route the message in accordance with the destination identifier and communication protocol through which the message is transferred. The message may be routed as a Short Message Service (SMS) message, a Multimedia Messaging Service (MMS) message, a message using a service that operates over Internet Protocol, or any other type of message that can be transferred over a communication system.

Upon receiving the message, message routing system 104 identifies an entity of the entities that are associated with a key indicator within content of the message (step 202). Content of the message comprises any information that the user entered or otherwise directed communication device 101 to include with the message and is separate from information, such as a telephone number, entered by the user to direct the message. The key indicator may be a character or string of characters, a word or string of words, an image, a video, audio, or any other type of content. The key indicator may be a portion of the message content or may be the entirety of the content. In an example, message routing system 104 may access a data structure that lists one or more key indicators associated with each entity that is associated with the destination identifier. Thus, the data structure provides the key indicators for message routing system 104 to identify from within the content. If one or more of the key indicators is present, the data structure further indicates which entity is associated with the identified key indicator(s). Other methods of determining an entity associated with an identified key indicator may also be used. The entity may be identified as a name of the entity, another type of identifier for the entity (e.g. a number), routing information Message routing system 104 then routes the message based on the entity (step 204). The routing information needed to route the message may be contained in the data structure discussed above or in a separate data structure containing routing information. In some embodiments, as noted above, the entity may be identified at step 202 as the routing information corresponding to the entity. The message may be routed internally to message routing system 104 or may be routed to one of entity systems 102 and 103 depending on how the routing information indicates that the message should be handled for the identified entity. Thus, in one example, the key indicator within the message content may be associated with an entity corresponding to entity system 102 and message routing system 104 routes the message to entity system 102. Alternatively, the key indicator may be associated with an entity corresponding to entity system 103 and message routing system 104 routes the message to entity system 103. Upon receiving the message, entity system 102 or 103 will process the message in the same way the message would be processed had the message been directed to a destination identifier associated with only a single entity.

Referring back to FIG. 1, communication device 101 comprises communication circuitry. The communication circuitry may be wired and/or Radio Frequency (RF) communication circuitry. The RF communication circuitry typically includes an amplifier, filter, modulator, and signal processing circuitry. RF communication circuitry may be coupled to an antenna. Communication device 101 may also include a user interface, memory device, software, processing circuitry, or some other communication components. Communication device 101 may be a telephone, computer, e-book, mobile Internet appliance, wireless network interface card, network interface card, media player, game console, or some other communication apparatus—including combinations thereof.

Entity systems 102-103 each comprise a computer system and communication interface. Entity systems 102-103 may each also include other components such as a router, server, data storage system, and power supply. Entity systems 102-103 may reside in a single device or may be distributed across multiple devices. Entity systems 102-103 are shown externally to message routing system 104, but systems 102-103 could be integrated within the components of message routing system 104.

Message routing system 104 comprises a computer system and communication interface. Message routing system 104 may also include other components such as a router, server, data storage system, and power supply. Message routing system 104 may reside in a single device or may be distributed across multiple devices. Message routing system 103 could be a mobile switching center, network gateway system, Internet access node, application server, service node, or some other communication system—including combinations thereof.

Communication links 111-113 uses metal, glass, air, space, or some other material as the transport media. Communication links 111-113 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 111-113 could be direct links or may include intermediate networks, systems, or devices.

Figure 3:
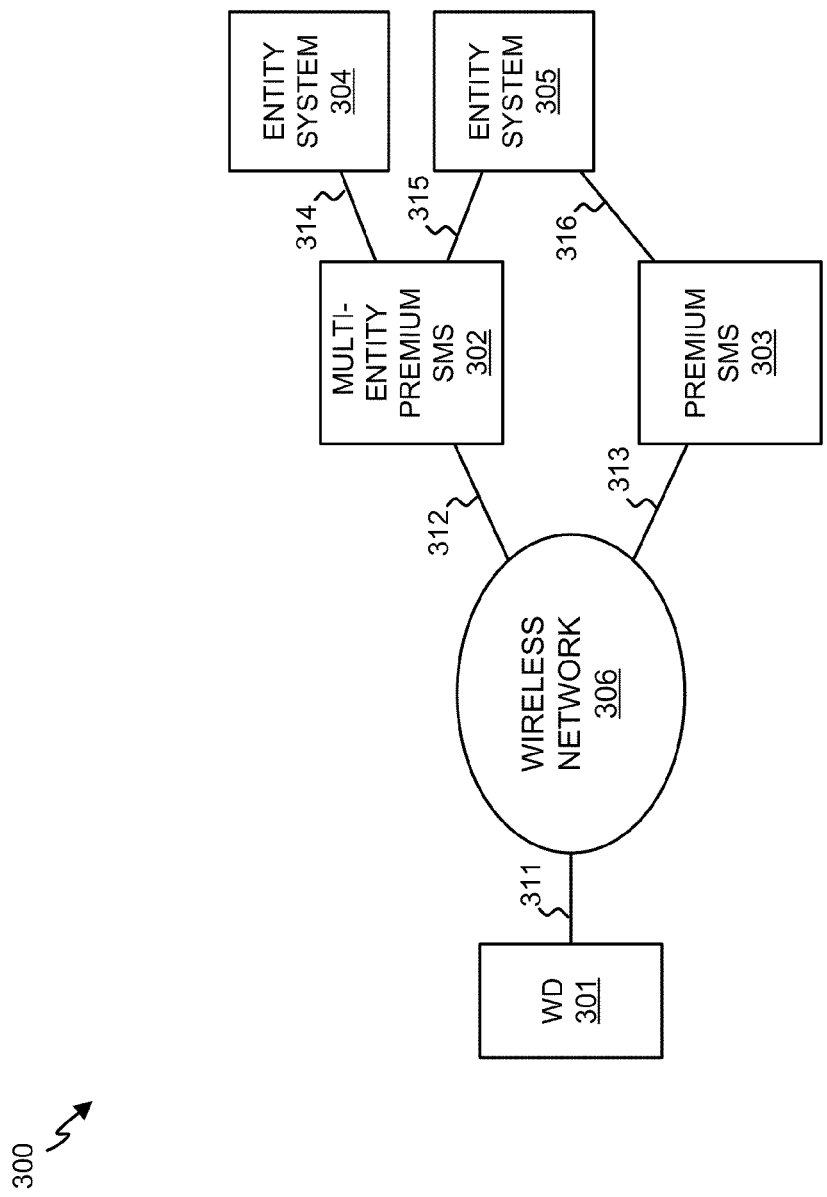
FIG. 3 illustrates a wireless communication system for routing messages having destination identifiers associated with multiple entities.

FIG. 3 illustrates wireless communication system 300. Wireless communication system 300 includes wireless communication device 301, multi-entity premium SMS system 302, premium SMS system 303, entity system 304, entity system 305, and wireless communication network 306. Wireless communication device 301 and wireless communication network 306 communicate over wireless link 311. Wireless communication network 306 and multi-entity premium SMS system 302 communicate over communication link 312. Wireless communication network 306 and premium SMS system 303 communicate over communication link 313. Multi-entity premium SMS system 302 and entity system 304 communicate over communication link 314. Multi-entity premium SMS system 302 and entity system 305 communicate over communication link 315. Premium SMS system 303 and entity system 305 communicate over communication link 316.

Wireless communication network 306 comprises network elements that provide communications services to wireless device 301. Wireless communication network 306 may comprise switches, wireless access nodes, Internet routers, network gateways, application servers, computer systems, communication links, or some other type of communication equipment—including combinations thereof. While shown separately, systems 302-305 may be incorporated into wireless communication network 306.

In operation, an operator of premium SMS system 303 is able to sell (or otherwise associate) the use of a particular short code to an entity wishing to use that short code in a campaign. The campaign may be advertising, voting, customer feedback, or any other type of reason for SMS interaction with a user. The short code is a number having digits less than would normally be required for sending an SMS message. For example, a typical phone number is 7 or 10 digits but a short code may comprise 5 digits. Premium SMS system 303 may be capable of handling SMS messages sent to multiple short codes. However, the use of each of the multiple short codes is sold to only a single entity at any given time. Thus, when premium SMS system 303 receives a message directed to a particular short code managed by premium SMS system 303, premium SMS system 303 handles the received message based on the single entity associated with the short code at the time the message is received.

In contrast, an operator of multi-entity premium SMS system 302 is able to sell (or otherwise associate) the use of a particular short code with more than one entity. In the following embodiments, multi-entity premium SMS system 302 distinguishes between the multiple entities associated with a single short code based on the content of the message. Thus, the operator is able to further monetize an individual short code by selling words or other character strings within the content of the SMS messages received using that short code.

Figure 4:
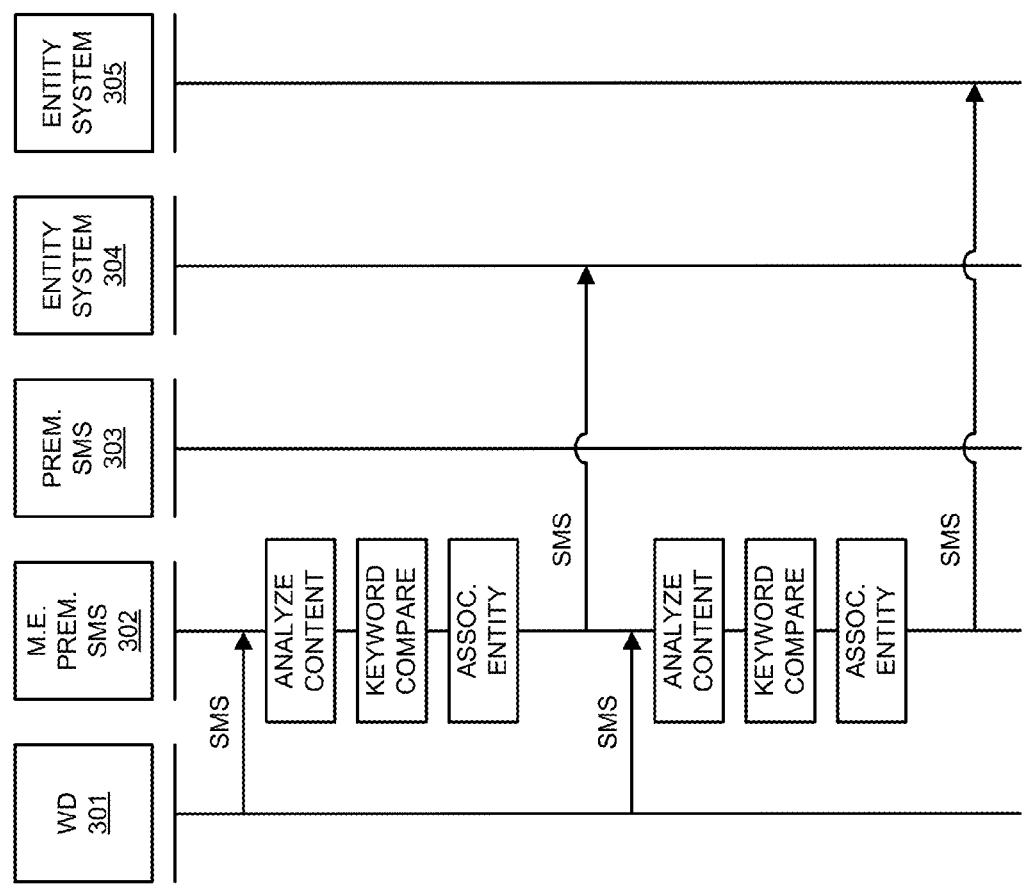
FIG. 4 illustrates an operation of the wireless communication system to route messages having destination identifiers associated with multiple entities.

FIG. 4 illustrates an operation of wireless communication system 300 to route messages having destination identifiers associated with multiple entities. In this embodiment, one of the short codes serviced by multi-entity premium SMS system 302 is associated with two entities corresponding to entity systems 304 and 305, respectively. Entity system 304 and 305 may be operated by the respective entities or may be operated by one or more third parties on behalf of the entities. Entity systems 304 and 305 may be configured to tabulate votes, respond to inquiries, process contest entries, or any other action that may be performed in response to receiving an SMS message.

A user of wireless device 301 instructs wireless device 301 to send an SMS message to the short code associated with entity systems 304 and 305. Based on the short code, wireless network 306 directs the SMS message to multi-entity premium SMS system 302. Upon receiving the SMS message, multi-entity premium SMS system 302 analyzing the content of the SMS message to determine to which of entity systems 304 and 305 the SMS message should be sent. Specifically, since both entity system 304 and 305 are associated with the short code used to send the text message, multi-entity premium SMS system 302 associates one or more unique key words with each entity system. In one example, the entities corresponding to each of entity systems 304 and 305 may purchase particular key words that will direct message to their respective systems. The content of the SMS message is any text or other information that the user directed to include within the body of the message.

While analyzing the SMS message, multi-entity premium SMS system 302 identifies a keyword in the content of the SMS message and determines that the identified keyword is associated with entity system 304. Therefore, multi-entity premium SMS system 302 transfers the SMS message to entity system 304.

At a later time, wireless device 301 is instructed by the user to transfer a different SMS message to the same short code but having different content. Upon receiving the new message, multi-entity premium SMS system 302 analyzes the content of the new message and identifies a keyword associated with entity system 305. Accordingly, multi-entity premium SMS system 302 transfers the different SMS message to entity system 305.

Figure 5:
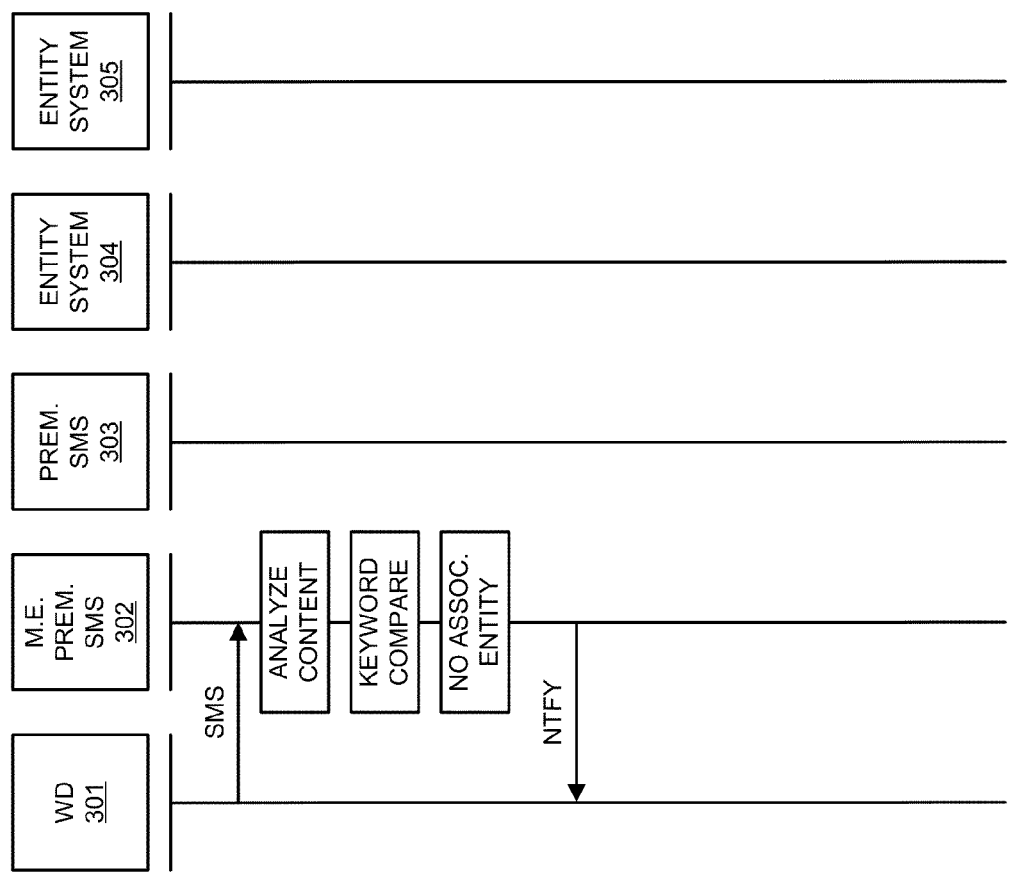
FIG. 5 illustrates an operation of the wireless communication system to route messages having destination identifiers associated with multiple entities.

FIG. 5 illustrates an operation of wireless communication system 300 to route messages having destination identifiers associated with multiple entities. In this example, wireless device 301 transfers an SMS message to the short code serviced by multi-entity premium SMS system 302 and associated with entity systems 304 and 305. Wireless network 306 routes the message to multi-entity premium SMS system 302 accordingly. Upon receiving the SMS message, multi-entity premium SMS system 302 analyzes the content of the message and determines that the content contains no keywords associated with either entity system 304 or 305. Therefore, multi-entity premium SMS system 302 transfers a notification to wireless device 301 indicating that the SMS message could not be delivered to a destination. In some examples, the notification message may also be an SMS message.

Figure 6:
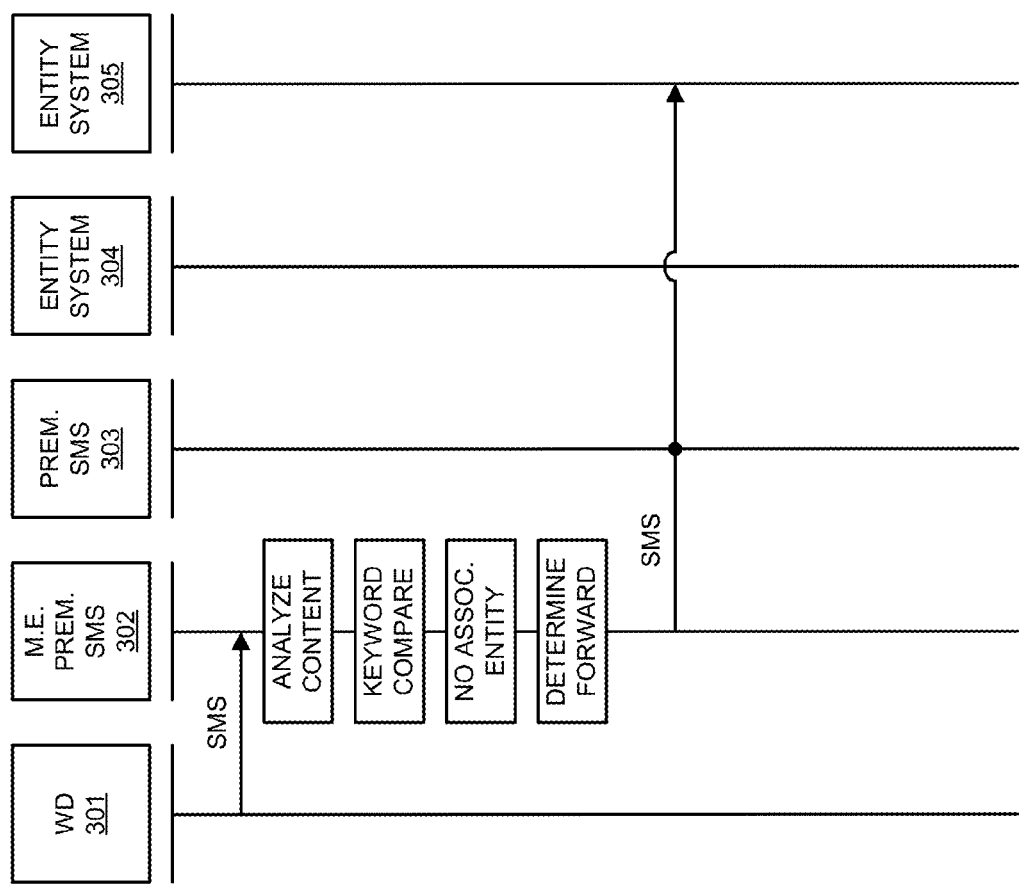
FIG. 6 illustrates an operation of the wireless communication system to route messages having destination identifiers associated with multiple entities.

FIG. 6 illustrates an operation of wireless communication system 300 to route messages having destination identifiers associated with multiple entities. In this example, wireless device 301 transfers an SMS message to the short code serviced by multi-entity premium SMS system 302 and associated with entity systems 304 and 305. Wireless network 306 routes the message to multi-entity premium SMS system 302 accordingly. Upon receiving the SMS message, multi-entity premium SMS system 302 analyzes the content of the message and determines that the content contains no keywords currently associated with either entity system 304 or 305. However, multi-entity premium SMS system 302 determines that the content includes one or more keywords previously associated with entity system 305.

In this example, when the SMS message is received, entity system 305 is no longer associated with multi-entity premium SMS system 302 and, therefore, is also no longer associated with the short code either. Instead, entity system 305 is now associated with premium SMS system 303 and a new short code serviced by premium SMS system 303. Entity system 305 may now be associated with premium SMS system 303 because the corresponding entity chose to end a customer relationship with the operator of multi-entity premium SMS system 302 and begin a customer relationship with the operator of premium SMS system 303. Multi-entity premium SMS system 302 is notified of entity system 305's new association and is able to determine forwarding information to route the message to entity system 305. From the forwarding information, multi-entity premium SMS system 302 can still route the SMS message to entity system 305. The message may be routed to entity system 305 directly or may be routed to premium SMS system 303 for routing to entity system 305.

Figure 7:
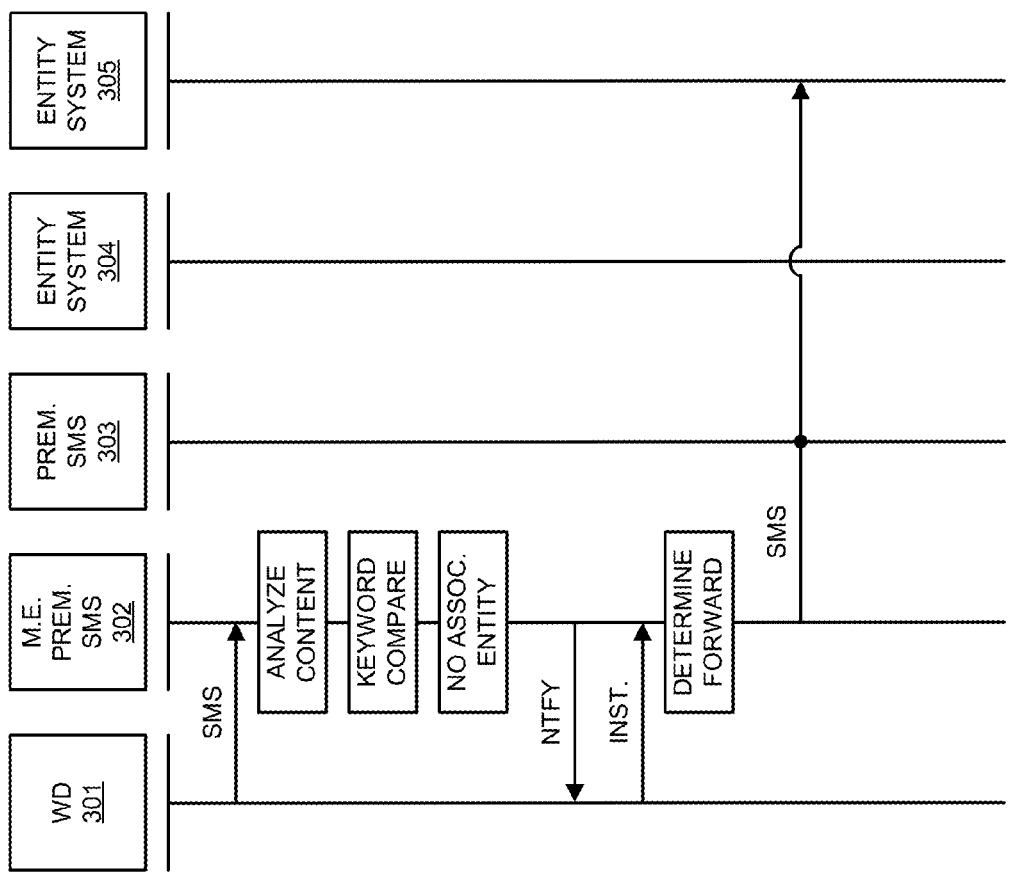
FIG. 7 illustrates an operation of the wireless communication system to route messages having destination identifiers associated with multiple entities.

FIG. 7 illustrates an operation of wireless communication system 300 to route messages having destination identifiers associated with multiple entities. In this example, like in the example of FIG. 6, multi-entity premium SMS system 302 determines that the content of a received SMS message contains one or more keywords associated with entity system 305, however, entity system 305 is no longer associated with the short code and multi-entity premium SMS system 302. Unlike FIG. 6, multi-entity premium SMS system 302 transfers a notification SMS message to wireless device 301 requesting instructions on how multi-entity premium SMS system 302 should handle the message received from wireless device 301.

The notification SMS message may set forth the options that the user of wireless device 301 has for routing the message. The user then responds to the notification SMS message with the desired option. For example, the notification message may give the option of replying 'send' to forward the message to entity system 305, 'auto' to forward all future messages having no longer associated keywords, 'discard' to discard the message, or some other option. Upon receiving a reply SMS message from wireless device 301, multi-entity premium SMS system 302 acts in accordance with the instructions included in the reply. That is, if the reply indicates that the original SMS message should be forwarded on to entity system 305, multi-entity premium SMS system 302 determines forwarding information for entity system 305 and forwards the message to entity system 305. If the reply indicates that the original message should be discarded, then multi-entity premium SMS system 302 discards the message. Likewise, multi-entity premium SMS system 302 may be configured to either discard or forward the message if a reply is not received within a predetermined amount of time.

In some embodiments, multi-entity premium SMS system 302 may determine that a word within the SMS message from wireless device 301 does not match but is close to a keyword associated with entity system 304 or 305. For example, a keyword associated with entity system 305 may be 'RED' while the content from wireless device 301 may include 'READ'. Thus, the notification message may ask the user of wireless device 301 if the user intended to send 'RED' instead. Alternatively, multi-entity premium SMS system 302 may route the message as if the message included 'RED' without notifying the user.

FIG. 8 illustrates wireless communication device 800 in an example of wireless communication device 301. Wireless communication device 800 includes touchscreen display 801, speaker 802, microphone 803, menu button 804, volume buttons 805, and sleep/wake button 806. Wireless communication device may include additional elements not depicted in FIG. 8, such as a camera, additional buttons, keyboard, among other items.

In this embodiment, multi-entity premium SMS system 302 has associated short code 86837 with both entity system 304 and entity system 305 since their corresponding entities both purchased the ability to use the short code digits that spell 'VOTES' on the number pad. The entity corresponding to entity system 304 is a television network that receives viewer votes regarding who should be removed from a reality show via SMS message. Accordingly, the television network has specified to multi-entity premium SMS system 302 that the names of the contestants on the reality show as keywords for routing to entity system 304. The television network can then advertise that viewers should text the name of who they want voted off the show to 'VOTES'.

Upon deciding that contestant Peter should be voted off the show, the user of wireless device 800 creates and sends a text message to 86837 (i.e. the number sequence corresponding to the word 'VOTES' on a phone keypad) with the name PETER in the body. Multi-entity premium SMS system 302 recognizes the keyword PETER within the text content and routes the message to entity system 304. Entity system 304 then tallies a vote for Peter in the voting for contestant removal.

FIG. 9 illustrates wireless communication device 900 in an example of wireless communication device 301. Wireless communication device 900 includes touchscreen display 901, speaker 902, microphone 903, menu button 904, volume buttons 905, and sleep/wake button 906. Wireless communication device may include additional elements not depicted in FIG. 9, such as a camera, additional buttons, keyboard, among other items.

In an extension of the embodiment from FIG. 8, the entity corresponding to entity system 305 is an auto company that is holding a contest for a new car that they are launching. Accordingly, the auto company is running a commercial that asks viewers to text their preferred car color to 'VOTES' in order to enter themselves into the contest. Multi-entity premium SMS system 302 is instructed to associate the possible colors for which a viewer could vote with entity system 305.

The user of wireless device 900 decides to enter the contest by voting for his or her favorite color red. Thus, the user creates and sends a text message to 86837 with the word RED in the body. Multi-entity premium SMS system 302 recognizes the keyword RED within the text content and routes the message to entity system 305 rather than entity system 304 since RED is not a keyword (i.e. a contestant name) associated with entity system 304. Entity system 305 then enters wireless device 301, and its user by association, into the contest for a red colored car.

Advantageously, the operator of multi-entity premium SMS system 302 can monetize the use of short code 86837 by both the television network and the auto company by selling keywords rather than just the short code itself.

Figure 10:
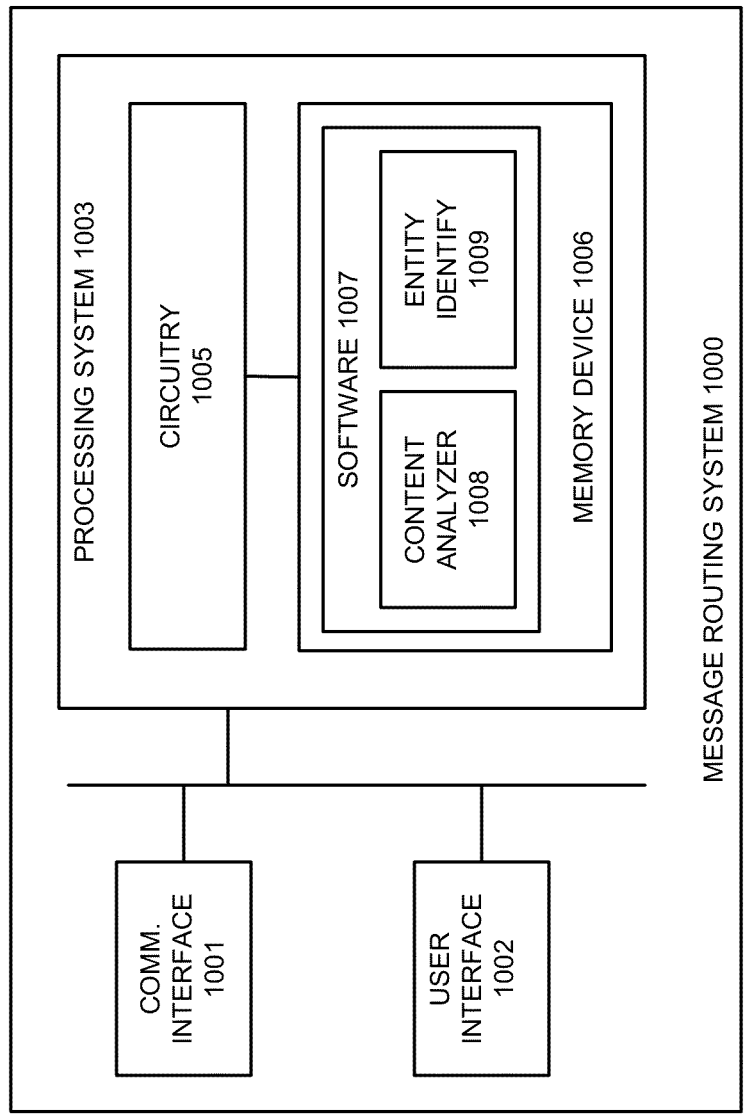
FIG. 10 illustrates a message routing system for routing messages having destination identifiers associated with multiple entities.

FIG. 10 illustrates message routing system 1000. Message routing system 1000 is an example of message routing system 104, although message routing system 104 may use alternative configurations. Message routing system 1000 comprises communication interface 1001, user interface 1002, and processing system 1003. Processing system 1003 is linked to communication interface 1001 and user interface 1002. Processing system 1003 includes processing circuitry 1005 and memory device 1006 that stores operating software 1007.

Communication interface 1001 comprises components that communicate over communication links, such as network cards, ports, RF transceivers, processing circuitry and software, or some other communication devices. Communication interface 1001 may be configured to communicate over metallic, wireless, or optical links. Communication interface 1001 may be configured to use TDM, IP, Ethernet, optical networking, wireless protocols, communication signaling, or some other communication format—including combinations thereof.

User interface 1002 comprises components that interact with a user. User interface 1002 may include a keyboard, display screen, mouse, touch pad, or some other user input/output apparatus. User interface 1002 may be omitted in some examples.

Processing circuitry 1005 comprises microprocessor and other circuitry that retrieves and executes operating software 1007 from memory device 1006. Memory device 1006 comprises a non-transitory storage medium, such as a disk drive, flash drive, data storage circuitry, or some other memory apparatus. Operating software 1007 comprises computer programs, firmware, or some other form of machine-readable processing instructions. Operating software 1007 includes content analyzer module 1008 and entity identification module 1009. Operating software 1007 may further include an operating system, utilities, drivers, network interfaces, applications, or some other type of software. When executed by circuitry 1005, operating software 1007 directs processing system 1003 to operate message routing system 1000 as described herein.

In particular, operating software 1007 directs processing system 1003 to receive, via communication interface 1001, a message from a communication device directed to message routing system 1000, wherein a destination identifier associated with a plurality of entities indicates the message routing system. Content analyzer module 1008 directs processing system 1003 to analyze content of the message for key indicators. Entity identification module 1009 directs processing system 1003 to identify an entity of the plurality of entities associated with a key indicator within content of the message and route the message based on the entity.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a data communication system to route user data messages to a plurality of destinations having destination codes based on a single routing code and a plurality of key indicators, the method comprising:

receiving individual ones of the key indicators and individual ones of the destination codes from individual ones of the destinations;

associating the individual ones of the key indicators with the single routing code and with the individual ones of the destination codes for the individual ones of the destinations;

receiving the user data messages transferred by user communication devices and containing the single routing code and individual ones of the key indicators;

transferring a notification message to the user communication devices requesting instructions on how to handle the user data messages containing the single routing code and individual ones of the key indicators and responsively receiving a response from the user communication devices indicating instructions on how to handle the user data messages;

translating the single routing code and the individual ones of the key indicators into the individual ones of the destination codes and adding the individual ones the destination codes to their respective user data messages; and transferring the user data messages for delivery to the individual ones the destinations based on the individual ones of the destination codes and the instructions from the user communication devices wherein the user data messages comprise at least one of a Short Message Service (SMS) message and a Multimedia Messaging Service (MMS) message and the single routing code comprises at least one of a premium SMS short code and a premium MMS short code.

2. The method of claim 1 further comprising transferring the single routing code and the plurality of the key indicators for delivery to the user communication devices.

3. The method of claim 1 wherein receiving the individual ones of the key indicators and the individual ones of the destination codes from the individual ones of the destinations comprises receiving time periods for the individual ones of the key indicators and the individual ones of the destination codes for the individual ones of the destinations.

4. The method of claim 3 further comprising detecting that one of the time periods for one of the key indicators and the single routing code has expired and responsively transferring notices to ones of the user communication devices previously using the one of the key indicators and the single routing code.

5. The method of claim 3 further comprising detecting that one of the time periods for one of the key indicators and the single routing code has expired and subsequently transferring notices to ones of the user communication devices that transfer additional user data messages with the one of the key indicators and the single routing code.

6. The method of claim 3 further comprising detecting that one of the time periods for one of the key indicators and the single routing code has expired and subsequently transferring another single routing code to ones of the user communication devices that transfer additional user data messages with the one of the key indicators and the single routing code.

7. The method of claim 3 further comprising detecting that one of the time periods for one of the key indicators and the single routing code has expired and subsequently forwarding ones of the user data messages having the one of the key indicators and the single routing code to another destination using another single routing code.

8. The method of claim 1 wherein the key indicator comprises at least one key word.

9. A data communication system to route user data messages to a plurality of destinations having destination codes based on a single routing code and a plurality of key indicators comprising:

a communication interface configured to receive individual ones of the key indicators and individual ones of the destination codes from individual ones of the destinations;

a data processing system configured to associate the individual ones of the key indicators with the single routing code and with the individual ones of the destination codes for the individual ones of the destinations;

the communication interface configured to receive the user data messages transferred by user communication devices and containing the single routing code and individual ones of the key indicators, transfer a notification message to the user communication devices requesting instructions on how to handle the user data messages containing the single routing code and individual ones of the key indicators, and responsively receive a response from the user communication devices indicating instructions on how to handle the user data messages;

the data processing system configured to translate the single routing code and the individual ones of the key indicators into the individual ones of the destination codes and to add the individual ones the destination codes to their respective user data messages; and the communication interface configured to transfer the user data messages for delivery to the individual ones the destinations based on the individual ones of the destination codes and the instructions from the user communication devices wherein the user data messages comprise at least one of a Short Message Service (SMS) message and a Multimedia Messaging Service (MMS) message and the single routing code comprises at least one of a premium SMS short code and a premium MMS short code.

10. The data communication system of claim 9 further comprising the communication interface configured to transfer the single routing code and the key indicators for delivery to the user communication devices.

11. The data communication system of claim 9 wherein the communication interface configured to receive the individual ones of the key indicators and the individual ones of the destination codes from the individual ones of the destinations comprises the communication interface configured to receive time periods for the individual ones of the key indicators and the individual ones of the destination codes for the individual ones of the destinations.

12. The data communication system of claim 11 further comprising the processing system configured to detect that one of the time periods for one of the key indicators and the single routing code has expired and the communication interface configured to responsively transfer notices to ones of the user communication devices previously using the one of the key indicators and the single routing code.

13. The data communication system of claim 11 further comprising the processing system configured to detect that one of the time periods for one of the key indicators and the single routing code has expired and the communication interface configured to subsequently transfer notices to ones of the user communication devices that transfer additional user data messages with the one of the key indicators and the single routing code.

14. The data communication system of claim 11 further comprising the processing system configured to detect that one of the time periods for one of the key indicators and the single routing code has expired and the communication interface configured to subsequently transfer another single routing code to ones of the user communication devices that transfer additional user data messages with the one of the key indicators and the single routing code.

15. The data communication system of claim 11 further comprising the processing system configured to detect that one of the time periods for one of the key indicators and the single routing code has expired and the communication interface configured to subsequently forward ones of the user data messages having the one of the key indicators and the single routing code to another destination using another single routing code.

16. The data communication system of claim 9 wherein the key indicator comprises at least one key word.

* * * * *